(12) United States Patent
Matsuo

(10) Patent No.: US 6,174,030 B1
(45) Date of Patent: Jan. 16, 2001

(54) SEAT HINGE FOR A VEHICLE

(75) Inventor: Harumi Matsuo, Hamamatsu (JP)

(73) Assignee: Suzuki Motor Corporation, Hamamatsu (JP)

(*) Notice: Under 35 U.S.C. 154(b), the term of this patent shall be extended for 0 days.

(21) Appl. No.: 09/277,179

(22) Filed: Mar. 26, 1999

(30) Foreign Application Priority Data

Mar. 27, 1998 (JP) .................................. 10-080639

(51) Int. Cl.⁷ .............................. E05D 11/06; B60N 2/02
(52) U.S. Cl. .................... 297/463.1; 297/378.1; 297/378.14; 16/374
(58) Field of Search ..................... 297/378.1, 378.14, 297/463.1; 296/65.16, 65.01; 16/374, 254

(56) References Cited

U.S. PATENT DOCUMENTS

| 563,133 | * | 6/1896 | Cabaret ........................... 16/374 |
| 1,205,411 | * | 11/1916 | Thulander et al. ............ 16/374 X |
| 1,522,994 | * | 1/1925 | Amsden ........................... 16/374 |
| 2,312,638 | * | 3/1943 | Gedris ........................... 16/374 X |
| 5,489,141 | * | 2/1996 | Strausbaugh et al. ......... 297/378.14 |
| 5,725,279 | * | 3/1998 | Ward et al. .................... 297/378.1 |
| 5,938,286 | * | 8/1999 | Jones et al. ................... 297/378.14 X |
| 5,951,108 | * | 9/1999 | Bauer et al. ................... 297/378.1 X |
| 6,030,044 | * | 2/2000 | Kosugi et al. ................. 297/463.1 X |

FOREIGN PATENT DOCUMENTS

| 2451693 | * | 5/1976 | (DE) ........................... 16/374 |
| 15460 | * | 1/1912 | (DK) ........................... 16/374 |
| 1350544 | * | 12/1963 | (FR) ........................... 16/374 |
| 14124 | * | 5/1902 | (GB) ........................... 16/374 |
| 844290 | * | 8/1960 | (GB) ........................... 16/374 |
| 1546104 | * | 5/1979 | (GB) ........................... 297/378.14 |
| 2182620 | * | 5/1987 | (GB) ........................... 296/65.16 |
| 359034941 | * | 2/1984 | (JP) ........................... 297/463.1 |
| 2-15410 | | 4/1990 | (JP) . |
| 8-169266 | | 7/1990 | (JP) . |
| 406166353 | * | 6/1994 | (JP) ........................... 297/378.1 |

\* cited by examiner

Primary Examiner—Peter M. Cuomo
Assistant Examiner—Rodney B. White
(74) Attorney, Agent, or Firm—Finnegan, Henderson, Farabow, Garrett & Dunner, L.L.P.

(57) ABSTRACT

A seat hinge for a vehicle that is structurally simple, easy to manufacture, and that simplifies mounting on the vehicle. The seat hinge includes a pair of male brackets attached to a seat back, a female bracket that can be affixed to a car body, and a support pin about which the aforementioned pair of male brackets can tilt. Control of the rotation of one of the male brackets around the aforementioned pin is achieved by a bead protruding from the support portion of the male bracket and abutting against an angular member forming an apex of the support portion of the female bracket.

13 Claims, 3 Drawing Sheets

SEAT HINGE FOR A VEHICLE

BACKGROUND OF THE INVENTION

1. Field of the Invention

The present invention is related to a seat hinge for a vehicle that supports the seat back of an automobile seat so that it can be folded over. More specifically, this invention is related to a seat hinge for a vehicle that supports a seat back designed to fold over forward.

2. Description of Related Art

The conventional structure of seat hinges for vehicles generally includes male brackets that are attached to seat backs of the seat, female brackets that are attached to the car body, and a pin that connects the two kinds of brackets so they pivot freely relative to each other. With this sort of structure, the seat backs of the vehicle seats are supported in a foldable manner, and can fold toward the front of the car.

Existing technology relating to this type of seat hinge includes, for example, Japanese Publicly Issued Patent Hei 2 (1990)-15410. Specifically, as shown in FIGS. 4 through 6 of that patent, the seat hinge structure described includes a center bracket (the female bracket) sandwiched between a pair of side brackets (the male brackets). These latter male brackets are supported by a pin or similar pivot so they may tilt freely. Also, the center bracket is firmly mounted to a surface of the car body by affixing screws. The pair of side brackets is also firmly mounted to the seat backs by affixing screws, in the same way as the center bracket is mounted to a surface of the car body, so that the seat backs are supported in a folding, or collapsible manner.

Another example of conventional technology relating to a seat hinge for use in vehicles is found in the report of Japanese Publicly Disclosed Patent Application Hei 8 (1996)-169266. According to this report, the structure of the seat hinge described is analogous to that shown in Japanese Publicly Issued Patent Hei 2 (1990)-15410. Specifically, a protrusion or bead extends from the female bracket where it is attached to a car body, and this bead directly contacts a male bracket support portion. The movement of the male brackets of the seat hinge is thus controlled to allow rotation toward the side of the device where the female bracket is attached to the car body. The result of this structure is that attachment components avoid obstructing the male brackets, making it easier to assemble the device.

According to these conventional designs, when a female bracket is attached to a car body, the male brackets can pivot freely around a pin. Thus, during the automobile seat assembly process, after the female bracket is firmly mounted to a car body by screws, the male brackets are free to rotate toward the car body because of their own weight. When this type of seat hinge is mounted to the vehicle, a worker performing the assembly must hold an assembly tool such as an impact driver in one hand, and align the female bracket with the car body while pressing the female bracket in place with the other hand. The worker must also hold the male brackets out of the way at the same time he presses the female bracket into place, to prevent the male brackets from interfering with the attachment devices. This structure thus results in an attachment process of the brackets to the car body that is complicated and cumbersome to carry out.

There are also disadvantages in the conventional method of attaching the male brackets to the seat backs. When the seat backs and the male brackets are assembled by being firmly attached together by screws or other fasteners, the attachment portions of the male brackets tilt towards the car body owing to their own weight. The assembly workers must align by hand the mounting parts of the attachment portions of the male brackets to the seat backs, by gripping and lifting the attachment portions of the male brackets, and aligning the mounting members of the seat backs and the male brackets. This alignment work must be performed even if the technology disclosed in Japanese Publicly Disclosed Patent Application Hei 8 (1996)-169266 is used, whereby male brackets are controlled to pivot in one particular direction with respect to the female bracket. In short, the technology described in Japanese Publicly Disclosed Patent Application Hei 8 (1996)-169266 does not teach a technique for aligning the mounting members of the attachment portions which resolves all the difficulties encountered in assembling the seats and supports.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To resolve the aforementioned problems, the present invention is a seat hinge for use in a vehicle, where the seat hinge structure consists of a pair of male brackets, each having an attachment portion that can be affixed to a seat back and a support portion to support the attachment portion, and a female bracket comprising an attachment portion that can be affixed to a car body and a support portion to support this attachment portion. A pin joins pivotally the support portions of the aforementioned pair of male brackets and the support portion of the aforementioned female bracket. The seat hinge for a vehicle according to the invention controls the range of tilting movement of at least one of the male brackets of the seat hinge around the aforementioned pin by using a raised bead protruding from the support portion of the male bracket and an angular member forming an apex arranged on the peripheral edge of the female bracket support portion. The raised bead interferes with the apex, and prevents relative rotation between the male and female brackets beyond a pre-set point.

The seat hinge for a vehicle according to the invention is such that the range of tilting movement around the pin of the second bracket of the pair of male brackets is also controlled by locating an angular member to form an apex on the second male bracket's support portion, and forming a raised bead extending from the peripheral edge of the aforementioned female bracket's support portion. Thus, the seat hinge for a vehicle according to the invention controls the tilting of both male brackets pivotally attached to the female bracket.

In the seat hinge for a vehicle according to the present invention, the pivotal movement of the male brackets is controlled so that the attachment portions face upward in the car interior when the bracket rotation is stopped in the folded over position, and in that position the seat backs are superimposed over the seat cushions.

The term "car body" as used in the above description generally refers to the overall area of the car body that neighbors the vehicle seats, and to which the seat hinge of the present invention can be attached. Thus, as long as the seat hinge according to the present invention can be attached to a body surface of the vehicle, the hinge can have any shape. For example, the hinge may be planar, may follow the contour the vehicle floor, or may have an angular or rounded cross section. Also, the overall car body can be a monocoque type, a chassis frame type, or other body design.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
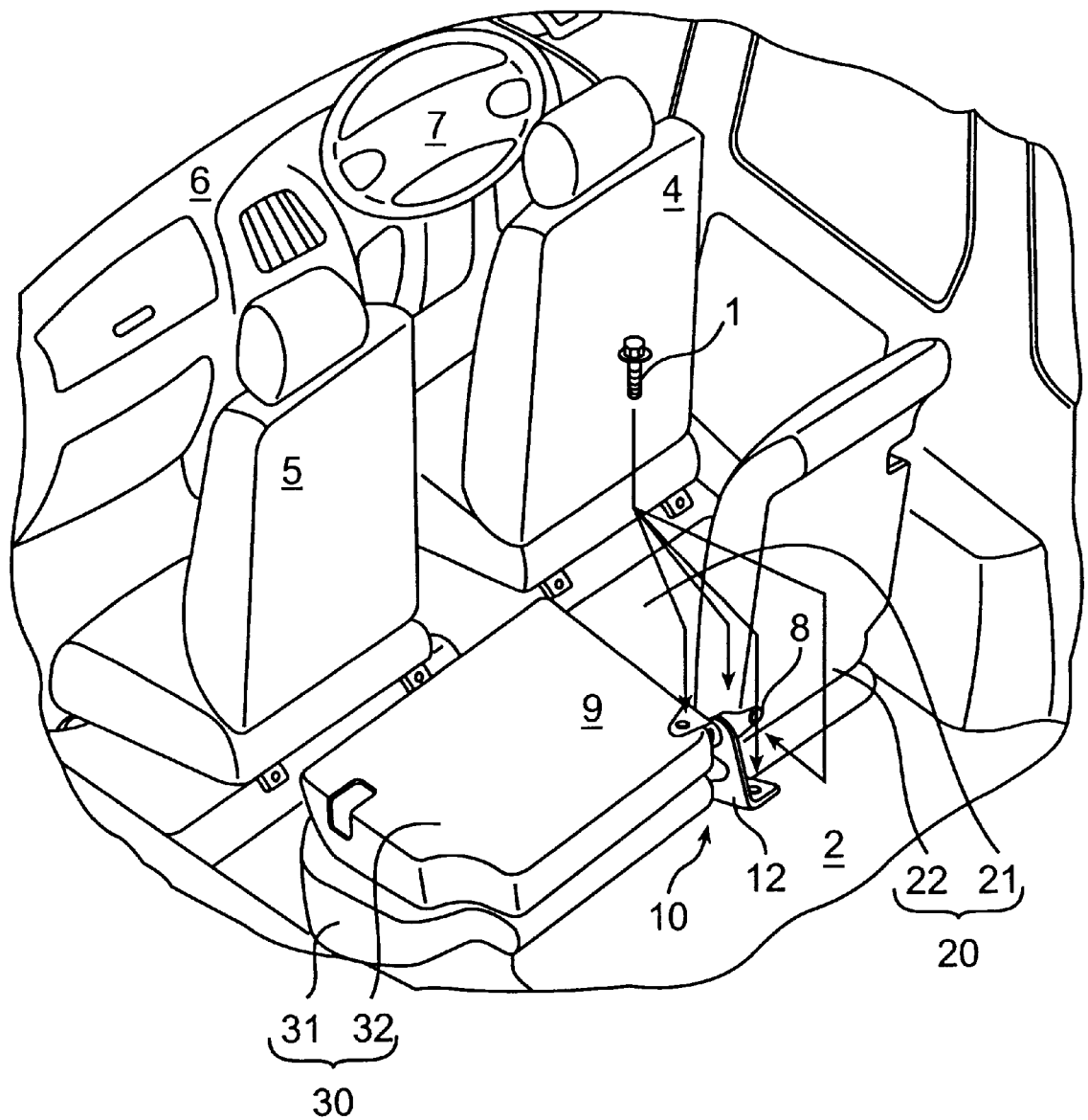
FIG. 1 is a perspective view of an automobile interior including a seat hinge according to one embodiment of the present invention.

FIG. 1 through FIG. 4 show an embodiment of the present invention. Specifically, FIG. 1 is a perspective view showing an automobile interior wherein a seat hinge 10 according to the present invention is attached to the automobile body.

Also shown in the automobile interior are, in addition to an instrument panel (6) and a steering wheel (7), multiple seats, such as a driver's seat (4), a passenger's seat (5), a right rear seat (20), and a left rear seat (30). Of these multiple seats, the seats in the rear, namely the right rear seat (20) and the left rear seat (30), are designed so that when the right seat back (22) and the left seat back (32) are rotated forward within the car, they are superimposed onto, respectively, the right seat cushion (21) and the left seat cushion (31). Accordingly, the goal in designing the right seat back (22) and left seat back (32) is that they can be used as both passenger seats when upright and as cargo transporting surfaces when folded. In the present embodiment, moreover, the seat cushion is a divided model having a right seat cushion (21) and a left seat cushion (31). However, a single-unit style seat cushion formed by an undivided unit is also suitable for use in the invention.

According to the invention, the vehicle seats may be attached to the car body by brackets, seat hinges, or other attachment devices. Moreover, the right rear seat (20) and the left rear seat (30) have foldable seat backs, these being, respectively, the right seat back (22) and the left seat back (32). For structural reasons, both the right seat back (22) and the left seat back (32) must be supported by a hinge in at least one location. For the seat hinge (10) of the present invention to satisfy this function, a screw (1) or similar fastener is used to firmly mount and support the right seat back (22) via the right male bracket (8) and the left seat back (32) via the left male bracket (9). The structure according to the invention provides that these brackets are firmly mounted by a threaded fastener (1) or the like to the floor (2) via a female bracket (12). In a preferred embodiment, the seat hinge (10) is arranged in a location between the right rear seat (20) and the left rear seat (30) in the rear part of the vehicle.

Figure 2:
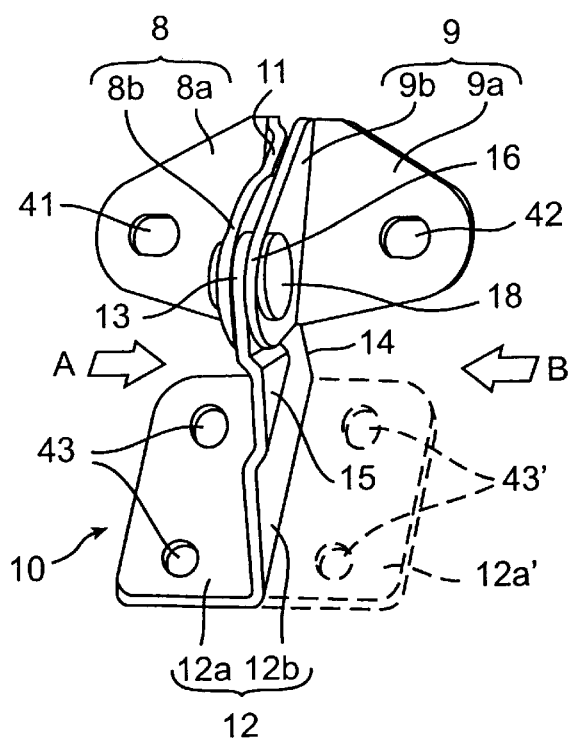
FIG. 2 is a perspective view showing in more detail the seat hinge of FIG. 1.
Figure 3:
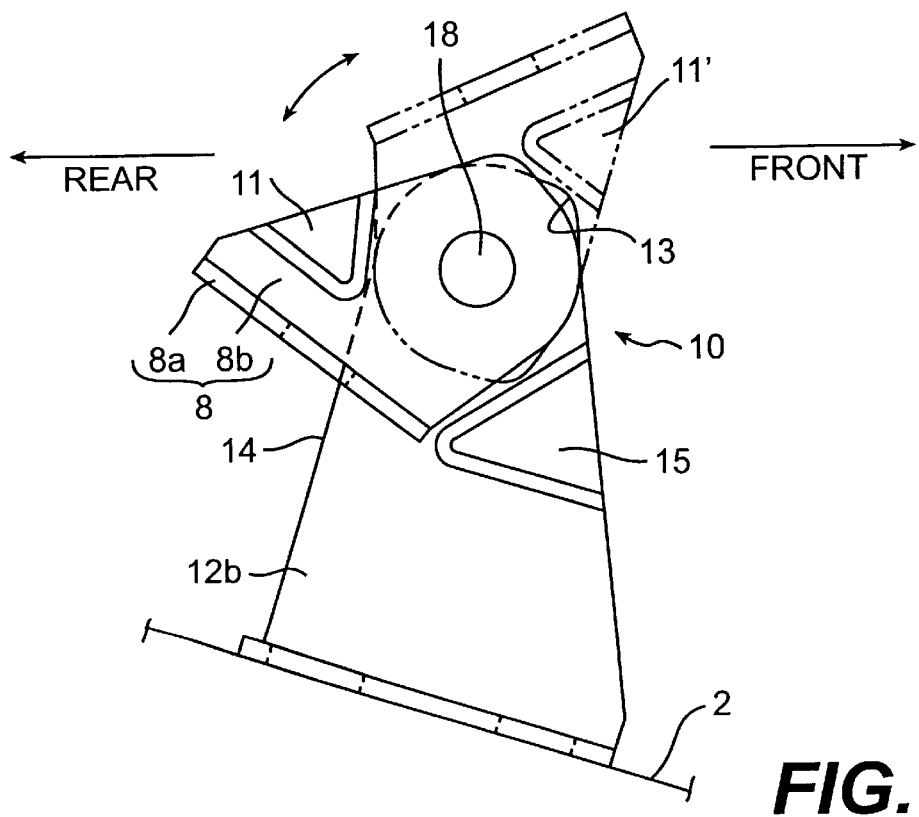
FIG. 3 is a side elevation view showing the seat hinge of FIG. 2 as seen from the direction of arrow A.
Figure 4:
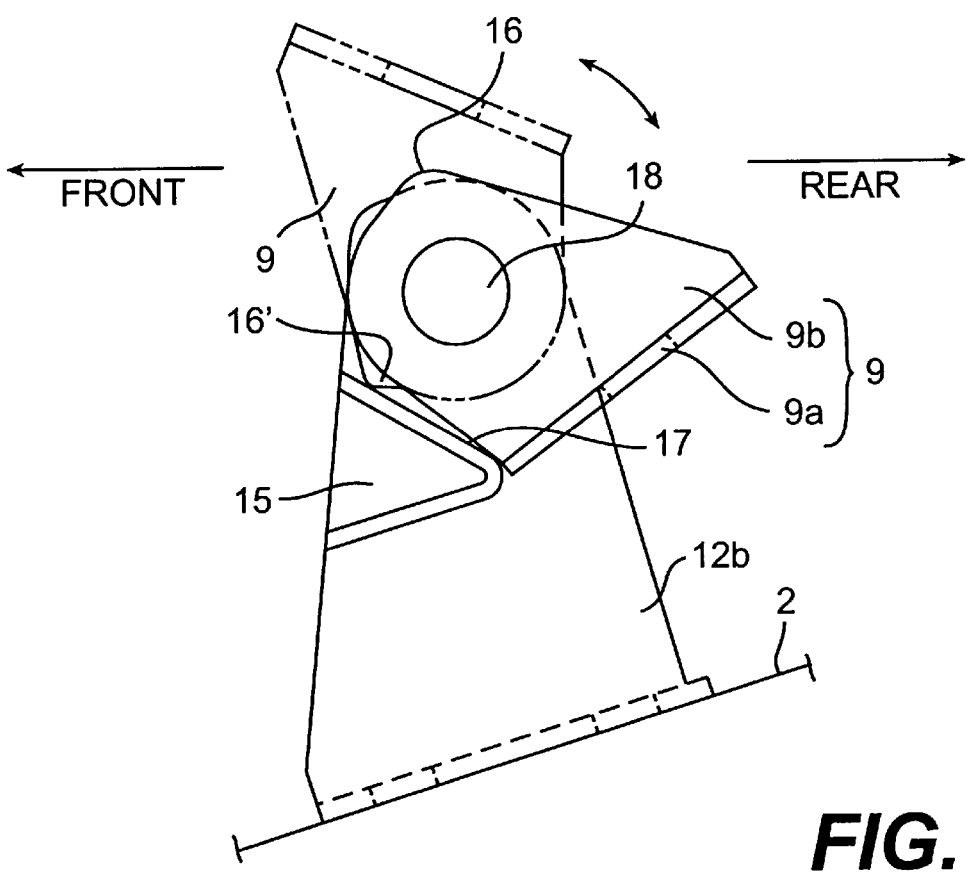
FIG. 4 is a side elevation view showing the seat hinge of FIG. 2 as seen from the direction of arrow B.

FIG. 2 through FIG. 4 depict a seat hinge (10) according to one embodiment of the present invention. FIG. 2 is a perspective overall view of the seat hinge (10) comprising a right male bracket (8), a left male bracket (9), a female bracket (12), and a pin (18). The right male bracket (8) and the left male bracket (9) are pivotally supported by pin (18) so they may tilt about the female bracket (12). Specific details about the structure of this seat hinge (10) are provided below.

The right male bracket (8) comprises an attachment portion (8a) that can be affixed by a screw (1) or similar fastener via an attachment hole (41) to the right seat back (22), and a support portion (8b) to support attachment portion (8a). A protruding bead (11), alternatively referred to as a male bracket bead is formed on support portion (8b). The preferred material used is steel plate such as SPHC, or another material having similar properties.

The left male bracket (9) comprises an attachment portion (9a) that also can be affixed by a screw (1) or similar fastener via an attachment hole (42) to the left seat back (32), and a support portion (9b) to support attachment portion (9a). An angular member (16) forms an apex on the peripheral edge of support portion (9b). The preferred material used is also steel plate such as SPHC, or another material having similar properties.

The female member (12) comprises an attachment portion (12a) that can be affixed by screws (1) or other fasteners via attachment holes (43) to the floor (2), and a support portion (12b) to support attachment portion (12b). Also, the peripheral edge of this support portion (12b) is provided with an apex formed by angular member (13). The preferred material used in this case is also steel plate such as SPHC, or another similar material.

When assembled, the support portion (12b) of the female bracket (12) is sandwiched between the support portion (8b) of the right male bracket (8) and the support portion (9b) of the left male bracket. Pin (18) acts as a pivot about which both the right male bracket (8) and the left male bracket (9) are free to rotate. Pin (18) also acts as a fastener to hold the support portions (8b), (9b), and (12b) in rotatable relationship. The preferred material used for pin (18) is bar steel, such as malleable steel.

The description above explains the structure of the components of seat hinge (10) according to one embodiment of the present invention. The control of the rotation range of the right male bracket (8) and the left male bracket (9) around pin (18), will be explained with reference to FIG. 3 and FIG. 4.

When the right male bracket (8) tilts toward the back of the car, as best shown in FIG. 3, the bead (11) formed on the support portion (8b) comes in contact with the edge surface (14) of the female bracket's support portion (12b), whereby the amount of tilting is controlled by edge surface (14) stopping bead (11) from further movement. When the right male bracket (8) tilts toward the front of the car, the bead (11) arranged on the support member (8b) tilts and moves to the position indicated by numeral (11') in FIG. 3, thus coming into contact with the apex formed by angular member (13) on the peripheral edge of the support portion (12b) of the female bracket (12). Thus forward rotation of the right male bracket (8) is stopped.

Similarly, when the left male bracket (9) tilts toward the rear of the car, the surface (17) of the support member (9b) comes into direct contact with the bead (15), alternatively referred to as a female bracket bead protruding from the support portion (12b) of the female member, as shown in FIG. 4. Tilting is controlled when bead (15) prevents further relative rotation of left male bracket (9) by stopping surface (17). However, when left male bracket (9) tilts toward the front of the car, the apex formed by angular member (16) on the peripheral edge of the support portion (9b) tilts and moves to the position shown by numeral (16'), shown in FIG. 4, coming into direct contact with the bead (15) arranged in the support portion (12b) of the female bracket (12). Thus the forward rotation of left male bracket (9) is also stopped.

Thus, the seat hinge (10) according to the present invention is designed to control both forward and backward tilting of the right male bracket (8) and of the left male bracket (9) with respect to female bracket (12). As a result, the right male bracket (8) only tilts toward the back of the car until its movement is stopped, so that when the attachment portion (12a) of the female bracket (12) is affixed to the vehicle floor (2), the right male bracket attachment portion (8a) does not obstruct the tools and fasteners used to secure the female bracket. The same goes for the left male bracket.

When the right male bracket (8) and the left male bracket (9) of the seat hinge (10) rotate to their furthest forward position, as controlled according to the present invention, the right seat back (22) and the left seat back (32) attached to the male brackets are superimposed on, respectively, the right seat cushion (21) and the left seat cushion (31) in a folded over configuration of the rear seat. When this positional relationship between seat backs and seat cushions is obtained, the attachment portion (8a) of the right male bracket (8) and the attachment portion (9a) of the left male bracket (9) are positioned in the vehicle facing upward. Thus, if a seat hinge according to the invention is used, workers in the automobile assembly process can easily affix the attachment portions (8a), (9a) via the respective attachment holes (41), (42) to the right seat back (22) and to the left seat back (32), and the rear seat assembly process is simplified.

The preceding text is a detailed explanation of one embodiment of the present invention. However, the present invention is not limited to the embodiment discussed above. Various examples of modifications and alterations are possible.

As shown in FIG. 2, for example, the attachment portion (12a') of the female bracket (12) can also be on the side of the left male bracket (9). In this case, the attachment holes (43') are arranged in the same way as in attachment portion (12a).

Also, the direction in which the bead (15) protrudes, said bead (15) being formed on the support portion (12b) of the female bracket (12), can also be on the side of the right male bracket (8); i.e., the side opposite to that in the embodiment discussed above. In this case, if the orientation of bead (11) and angular member (16) arranged on the right male bracket (8) and the left male bracket (9) are completely reversed, the resulting seat hinge will be a conceptually identical mirror image of the seat hinge (10) discussed above.

In the present invention, the female bracket can be attached to a car body more easily than a conventional bracket. Also, when the seat backs and the male brackets are firmly mounted, excessive tilting of the male bracket attachment portions toward the car body due to the weight of the pieces can be prevented. Consequently, aligning the affixing members of the attachment portions of the male brackets with the seat backs is simplified, since assembly line workers do not need to grip and lift the male bracket attachment portions and align them with the mounting members to attach the seat backs and the male brackets. Thus, the assembly tasks of workers in the automobile assembly process can be simplified, lowering the number of man hours required by the automobile assembly process, improving manufacturing processes in the plant, and also reducing cost.

The forward tilting of the right and left male brackets is controlled according to the present invention so that when the seat backs are tilted to the folded over position, they are superimposed on top of the respective seat cushions. In this configuration, the male bracket attachment portions are rotated so they face upward with respect to the vehicle, and workers can easily secure the attachment portions to the seat backs during assembly of the rear seats.

According to a preferred embodiment of the present invention, the material out of which the pair of male brackets and the female bracket components of the seat hinge are ordinarily formed is steel plate that has been press formed, or a material having similar properties. Thus, the beads and angular members that control the rotation of the pair of male brackets around the pin, as well as the bead and angular member of the female bracket, can be formed at the same time that press forming of the brackets takes place. Therefore, the seat hinge of the present invention is easy to manufacture, no special costs are incurred to implement this invention, and the seat hinge is highly convenient.

It will be apparent to those skilled in the art that various modifications and variations can be made in the seat hinge of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A seat hinge for a vehicle seat, comprising:
    a first male bracket and a second male bracket each having an attachment portion for attaching to first and second respective seat backs of the vehicle seat, and a support portion connected to the attachment portion;
    a female bracket having an attachment portion for attaching to the vehicle, and a support portion connected to the attachment portion, the support portion having a first angular member arranged on its peripheral edge;
    a pin for rotatably connecting the support portion of the female bracket and the support portions of each of the first and second male brackets;
    wherein the support portion of the first male bracket comprises a male bracket bead protruding in a direction substantially parallel to an axis of rotation of the first male bracket to abut the first angular member to limit rotation of the first male bracket relative to the female bracket, the female bracket further includes a female bracket bead, and the second male bracket comprises a rear edge for abutting the female bracket bead to limit rearward rotation of the second male bracket relative to the female bracket.

2. The seat hinge according to claim 1, wherein the second male bracket further comprises a second angular member located on a peripheral edge of the support portion and adapted to abut the female bracket bead to limit forward rotation of the second male bracket relative to the female bracket.

3. The seat hinge according to claim 2, wherein the male bracket bead and first angular member limit forward rotation of the first male bracket, and the female bracket bead and second angular member limit forward rotation of the second male bracket, so that the first and second male brackets are limited to moving in an upward facing orientation corresponding to a folded over configuration of the seat.

4. The seat hinge according to claim 2, wherein the female bracket support portion further comprises a rear edge for abutting the male bracket bead to limit rearward rotation of the first male bracket.

5. The seat hinge according to claim 1, wherein the female bracket and the first and second male brackets are made of steel plate.

6. The seat hinge according to claim 1, wherein the support portion of the female bracket is sandwiched between the support portions of the first and second male brackets.

7. The seat hinge according to claim 1, wherein the support portion of the female bracket includes a planar surface defining an angle relative to the attachment portion of the female bracket.

8. The seat hinge according to claim 7, wherein the female bracket bead includes an inclined surface defining an angle relative to the planar surface of the support portion of the female bracket and contacting the rear edge of the second male bracket when the second male bracket is in a rearward position.

9. The seat hinge according to claim 7, wherein the female bracket bead includes a protruding surface extending substantially parallel to and spaced from the planar surface of the support portion of the female bracket.

10. The seat hinge according to claim 1, wherein the support portions of the first and second male brackets each include a planar surface defining an angle relative to the respective attachment portions of each of the first and second male brackets.

11. The seat hinge according to claim 10, wherein the male bracket bead includes an inclined surface defining an angle relative to the planar surface of the support portion of the first male bracket and contacting an edge surface of the female bracket when the first male bracket is in a rearward position.

12. The seat hinge according to claim 10, wherein the male bracket bead includes a protruding surface extending substantially parallel to and spaced from the planar surface of the support portion of the first male bracket.

13. The seat hinge according to claim 1, wherein the female bracket bead protrudes in a direction substantially parallel to an axis of rotation of the first and second male brackets.

* * * * *